Aug. 21, 1962 W. H. HILL 3,050,696

PHOTO-TRANSDUCER SIGNAL COMPRESSOR

Filed Feb. 10, 1959

INVENTOR
William H. Hill
BY John J. Rogan
ATTORNEY

United States Patent Office 3,050,696

Patented Aug. 21, 1962

3,050,696

PHOTO-TRANSDUCER SIGNAL COMPRESSOR

William Howard Hill, Bronx, N.Y., assignor, by mesne assignments, to Litton Systems, Inc., Beverly Hills, Calif., a corporation of Maryland Filed Feb. 10, 1959, Ser. No. 792,285
2 Claims. (Cl. 332—3)

This invention relates to photo-transducing systems, and more particularly it relates to systems for converting electromagnetic radiations such as light-wave signals into corresponding modulated electric carriers.

A principal object of the invention is to provide a novel modulation-compressor for light-wave translating systems, such for example as electric facsimile systems and the like.

Another object is to provide a novel signal compressor for a light-wave signal transducing system employing an electron multiplier tube as the compressing control.

Another object is to provide a novel signal compressor for carrier modulating systems wherein an electron multiplier tube is used as a signal compressor, and the signal compression is effected while maintaining a maximum signal output level and a minimum of drifting of the said level during steady state conditions and the like.

A feature of the invention relates to a signal compressor for carrier wave modulators employing a photo-multiplier electron tube having a final dynode and an output anode, which is provided with special circuit connections whereby the output anode or anodes are always at a positive potential with respect to the final dynode while achieving a dropping voltage characteristic or gain which is in inverse relation to the change of the light-wave excitation level.

Another feature relates to a novel circuit arrangement employing a photo-multiplier electron tube as a control device, wherein the final anode of the multiplier tube is always maintained at a positive bias, whereby the output characteristics of the tube are rendered more stable.

A further feature relates to a novel facsimile transmission system, employing a photo-multiplier electron tube for controlling the modulation level of facsimile transmission signals.

A still further feature relates to the novel organization, arrangement and relative location and interconnection of parts which cooperate to provide an improved facsimile transmission modulator.

While the invention will, for illustrative purposes, be described in connection with an electric facsimile transmission system, it will be understood that the inventive concept is equally well applicable to other systems which require translation of electromagnetic radiations of variable intensity into corresponding electric signals. Furthermore, since facsimile apparatus is well known, only those portions of a facsimile system are shown as are necessary to a proper understanding of the invention.

Figure 1:
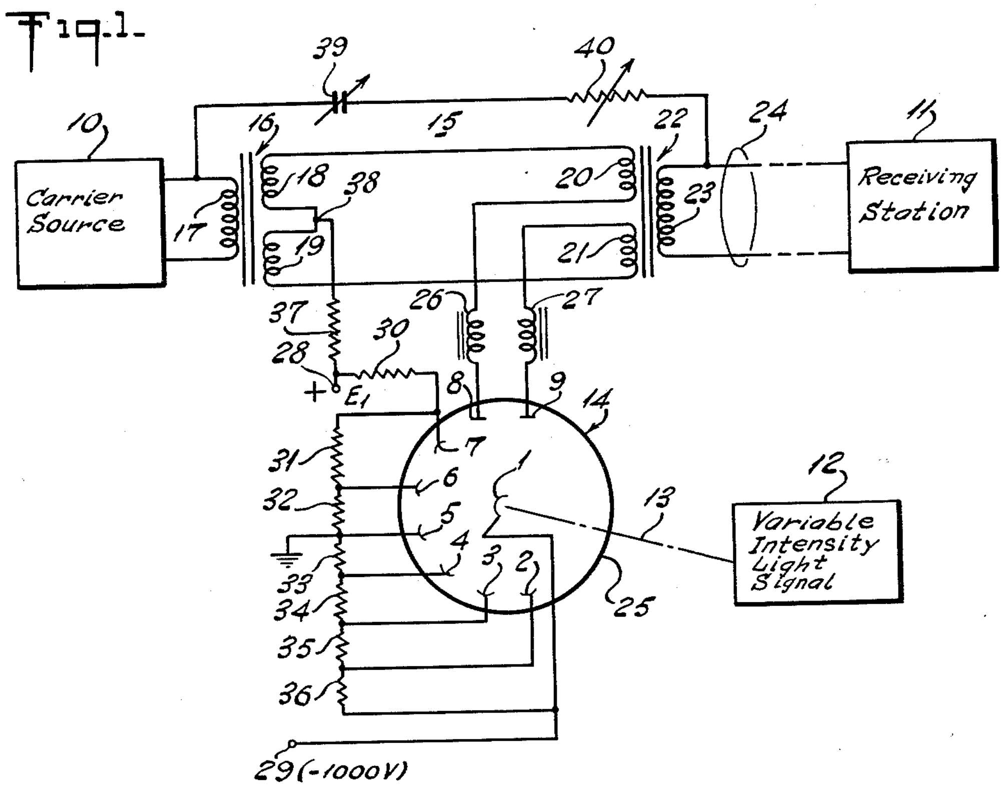
FIG. 1 is a composite schematic block and wiring diagram of a transmission system embodying the invention.

In FIG. 1, the block 10 represents any well known source of carrier current waves such as are conventionally employed in facsimile transmitters and the like. The clock 11 represents any well known form of facsimile receiver at a receiving station for receiving the transmitted modulated carrier, and converting it back into corresponding light-wave signals. The block 12 represents any well known source of light-wave signals which, in the case of a facsimile transmitter, will include the usual scanning mechanism for scanning a subject matter in a point-by-point manner to produce a light beam 13 which varies in intensity with the shades of the successively scanned elemental areas of the subject matter.

It will be understood that the receiver 11 also includes any well known apparatus for translating the received electric facsimile signals and using said signals to act upon the successive elemental areas of a recording surface or blank. It also will be understood that the usual synchronizing arrangements are provided for phasing and synchronizing the transmitting scanner associated with the source 12, with the movable recording element of the receiver 11.

The numeral 14 represents any well known form of photo-multiplier electron tube such, for example, as an Ediswan type 27M13 amplifier phototube sold by Siemens Edison Swan Ltd. (London). That particular kind of tube has a main photo-cathode 1 in cooperative photo-multiplier relation with a series of dynodes. While the drawing shows six such dynodes designated 2–7, it will be understood that a greater or less number of such dynodes may be employed. The anodes cooperating with the said dynodes are designated with the numerals 8 and 9 which are in cooperative relation with the final dynode 7. The output voltage from the anodes 8 and 9 is therefore determined by the intensity of the beam 13 which strikes the main photo-cathode 1 to release photo-electrons which are successively multiplied by the various dynodes and result in potential variations at the anodes 8, 9.

The numeral 15 represents a carrier wave modulating network whose output volume compression is to be controlled automatically by the tube 14. Network 15 is preferably, although not necessarily, of the balanced bridge kind, employing for example an input transformer 16 having a primary winding 17 connected to the carrier source 10. Coupled with winding 17 are a pair of balanced secondary windings 18, 19 which are connected in circuit with a corresponding pair of balanced primary windings 20, 21 of an output transformer 22, whose secondary winding 23 is connected to a suitable line or transmission channel 24 leading to the receiving station 11. It will be understood that wherever necessary in the system, suitable amplifiers (not shown) may be used.

Since photo-multiplier electron tubes are well known in the art, detailed description thereof is not necessary. In the case of the particular amplifier tube schematically shown in FIG. 1, it may comprise the usual evacuated glass bulb or envelope 25 having mounted therein the cathode 1, the dynodes 2–7, and the anodes 8, 9. The anodes 8 and 9 are connected in series with the respective transformer windings 20, 21 of the modulation network through respective choke coils 26, 27 for eliminating transients which may tend to arise in the circuit. The source of direct current voltage, for example 1,000 volts, has its positive pole connected to the terminal 28 and its negative pole connected to the terminal 29. The terminals 28 and 29 are connected together through a series of voltage divider resistors 30, 31, 32, 33, 34, 35, 36. Each of the voltage divider resistors 31–35 is bridged across a chosen pair of dynodes. The resistor 30 for the final dynode is connected to the positive terminal 28 and thence through impedance means for example another resistor 37 to the mid-point 38 between the windings 18 and 19. One of the intermediate dynodes, for example dynode 5, may be connected to ground. Resistor 37 carries only a small amount of current, for example of the order of a few microamperes and is very high in resistance as compared with the bleeder resistors 30, etc., in the voltage divider network. It is clear, therefore, that by reason of the circuit connections above described the anodes 8 and 9 are always positively biased with respect to the cooperating final dynode 7.

By reason of the connection of impedance means or resistor 37 in circuit with the anodes 8 and 9 and the final dynode 7, the desired output compressing action in the modulated carrier is achieved due to potential drop across that resistor. The modulator network 15 includes an adjustable capacitor 39 and an adjustable resistor 40, the purpose of which is to balance the network against stray currents in the modulation system. As is well understood, the variations of excitation of the cathode 1 will, as a result of the successive excitations of the multiplier dynodes 2–7, result in a corresponding unbalance at the modulator network and a consequent modulation of the carrier from source 10.

The compression action of the tube 14 also takes place during the modulation. Thus, as the level of the light from beam 13 increases, the current to the anodes 8 and 9 correspondingly increases, resulting in a corresponding drop in the potentials between the anodes and the final dynode, with a consequent lowering of the gain or amplitude ratio between light level and output modulation level. This not only produces the desired compression in the output modulation envelope, but it has been found to reduce also the possibility of level drifting during steady state conditions, for example when the light beam 13 is at a constant intensity for a substantial length of time. It should also be observed that by maintaining the anodes 8, 9 positive with relation to the final dynode, the output or gain of the modulation system is substantially higher than when the anodes are not positively biased or are negatively biased with respect to the final dynode. Heretofore it has been thought necessary to avoid the use of such positive bias on the anodes of the photo-multiplier tubes in order to make the tube stable in operation. The circuit embodied in FIG. 1 achieves the desired stability while also achieving the desired compression effect on the modulation envelope with the anodes positively biased with respect to the final dynode.

It will be understood that the invention is not limited to any particular kind or construction of photo-multiplier tube, whether employing a single output anode or a plurality of output anodes. Thus, the system can be operated with a photo-multiplier tube of the single anode kind, as shown schematically in FIG. 2. The parts of FIG. 2 which are the same in function as those in FIG. 1, bear corresponding designation numerals. The photo-multiplier tube 14*a* may be of the kind having a main cathode 1 with a series of multiplier dynodes 2–7 and a single anode 8. It will be understood that any desired number of multiplier dynodes may be used. For example, the tube 14*a* may be an RCA tube 931A photo-multiplier tube which has a main cathode and a series of nine multiplier dynodes and a single anode.

Figure 2:
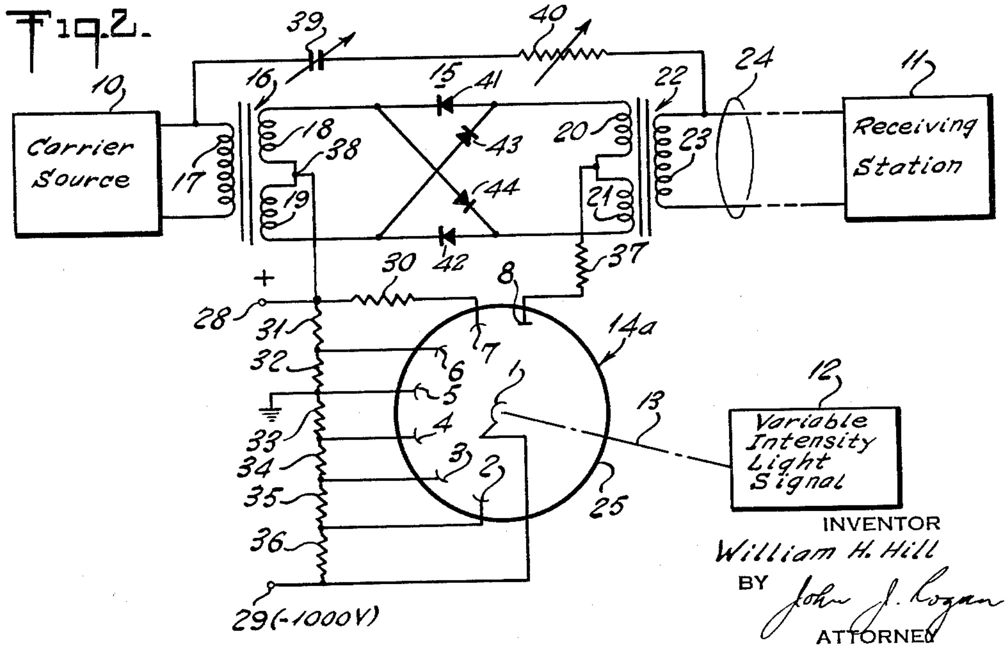
FIG. 2 is a modification of the system of FIG. 1.

The modulator network 15 in FIG. 2 may be of the ring modulator kind having a pair of series diodes 41, 42 and cross connected diodes 43, 44, which constitute a ring modulator and act as switches in the conventional manner as well known in connection with balanced bridge circuits. The operation of FIG. 2 in achieving the desired stability of operation of the tube 14*a* and the desired compression in the output modulated signals is substantially the same as that of FIG. 1 since the anode 8 is positively biased by being connected through the bridge and through resistor 37 to the positive terminal 28.

Various changes and modifications may be made in the disclosed embodiments without departing from the spirit and scope of the invention. For example, in the embodiment of FIG. 1, employing dual anodes 8 and 9, instead of having two distinct anodes 8 and 9, one of these anodes, for example the anode 8, may be actually the final dynode of the tube without changing the compressing action and stability of operation.

What is claimed is:

1. A multiplier phototube circuit comprising
 a multiplier phototube having an anode, a photo-cathode, at least one intermediate dynode and a final dynode,
 means including a direct-current source of voltage and a voltage divider to apply a unidirectional voltage between said photo-cathode and each of said dynodes,
 a resistor connected to the positive terminal of said direct-current source and
 a load circuit having impedance connected to said phototube anode,
 said load circuit consisting of said resistor and the impedance of the load circuit whereby the drop in potential across said resistor maintains said anode at a positive potential with respect to said final dynode which decreases with increase in anode current through said phototube.

2. A modulator comprising
 a bridge modulator network having a pair of balanced input windings and a pair of balanced output windings,
 the junction between each input winding constituting one conjugate point of the bridge,
 a light scanner modulator and compressor device connected between said conjugate point and the balanced output windings,
 said device including a multiplier phototube having a pair of output anodes each connected to a corresponding one of the balanced output windings and a final dynode, and
 means to maintain the output anodes of said tube at a positive bias potential with respect to the cooperative final dynode which positive bias decreases as the anode current increases,
 said last mentioned means comprising a resistor in circuit with said anodes.

References Cited in the file of this patent

UNITED STATES PATENTS

| | | |
|---|---|---|
| 2,541,060 | Hester et al. | Feb. 13, 1951 |
| 2,707,238 | Fromm | Apr. 26, 1955 |
| 2,815,453 | Colson et al. | Dec. 3, 1957 |
| 2,828,424 | Moe | Mar. 25, 1958 |
| 2,829,345 | Sieber | Apr. 1, 1958 |
| 2,913,585 | Rodman | Nov. 17, 1959 |
| 2,971,433 | Akin | Feb. 14, 1961 |